(12) United States Patent
Laschke et al.

(10) Patent No.: US 7,273,298 B2
(45) Date of Patent: Sep. 25, 2007

(54) CONTROL UNIT FOR MIXED LIGHT ILLUMINATION, ESPECIALLY FOR MICROSCOPY

(75) Inventors: Axel Laschke, Budenheim (DE); Walter Körner, Saulheim (DE); Charles Willis, Doncaster (GB)

(73) Assignee: Schott AG, Mainz (DE)

( * ) Notice: Subject to any disclaimer, the term of this patent is extended or adjusted under 35 U.S.C. 154(b) by 875 days.

(21) Appl. No.: 10/602,209

(22) Filed: Jun. 24, 2003

(65) Prior Publication Data

US 2004/0190132 A1   Sep. 30, 2004

(30) Foreign Application Priority Data

Mar. 19, 2003   (DE) .......................... 203 04 412 U

(51) Int. Cl.
*F21V 33/00*   (2006.01)
(52) U.S. Cl. ...................... 362/234; 359/385; 340/584; 340/664
(58) Field of Classification Search .................... 362/8, 362/11, 276, 295, 234; 359/385; 340/584, 340/664
See application file for complete search history.

(56) References Cited

U.S. PATENT DOCUMENTS 5,559,631 A * 9/1996 Remer et al. ............... 359/385

5,690,417 A   11/1997 Polidor et al.

FOREIGN PATENT DOCUMENTS

DE   198 20 012 C1   2/2000
EP   1 150 154 A1   10/2001

\* cited by examiner

*Primary Examiner*—Laura Tso
(74) *Attorney, Agent, or Firm*—Michael J. Striker

(57) ABSTRACT

A control unit for a microscope, a stereomicroscope, or an industrial image processing machine is described, to which at least three lighting units, e.g. for incident light-bright field illumination, incident light-dark field illumination, and for transmitted light illumination, are connected. Respective lighting units are simultaneously controlled according to user commands, e.g. for interval control to simulate a moving light source. The user commands can be input by function keys and/or a foot switch and/or stored in a memory provided in the control unit. Alternatively or in addition, the control unit can receive command statements from an external computer connected via an interface or control signals from an external camera. The control unit detects temperatures of the lighting units and shuts off a lighting unit or generates a warning signal when its temperature becomes excessive.

29 Claims, 2 Drawing Sheets

CONTROL UNIT FOR MIXED LIGHT ILLUMINATION, ESPECIALLY FOR MICROSCOPY

BACKGROUND OF THE INVENTION

1. Field of the Invention

The present invention relates to a control unit for mixed light illumination, especially for control of LED lighting devices of a microscope, stereomicroscope, macroscope and industrial image processing and/or vision machine. For simplicity in the following the term "microscope" is used in some cases for the foregoing devices in the specification below.

2. Description of the Related Art

The optimum illumination of objects to be examined plays an important role in microscopy. Whether accurate images or shapes are to be detected by an observer or automatic image analysis system generally depends on the illumination. Stereomicroscopy puts especially high requirements on the quality of the illumination. In that area exactly point-wise production of light and shadow often occurs. The more accurately the incident light falling on the object is controlled, the more information can be obtained by microscopic examination of the object.

Illumination used in microscopy is generally divided into two basic classes, incident light illumination and transmitted light illumination. In each of these classes bright field illumination and dark field illumination are distinguished from each other. Each of these types of illumination may be again divided. For example, incident light-bright field illumination includes shadow-free incident light inclined incident light, vertical incident light, coaxial incident light, diffuse incident light, etc. Each of these types of illumination produces certain light-shadow conditions and thus the desired contrast of the object being examined.

Fiber optic and LED illumination systems are established as illumination sources. Fiber optic illumination systems generally include cold light sources and various light guides connected to a light source. Different types of light guides are known to provide the above-described types of illumination. DE 198 20 012 C1 describes a fiber-optic transmitted light device for producing bright field illumination in transmitted light. This device has a cold light source connected to a light distributing body formed as a hollow chamber by means of a light guide. The input end of the light guide is connected to the cold light source and the output end to the light distributing body. Further examples fiber optic illumination systems include split or multipoint ring guides for producing a shadow-free bright field illumination in incident light, dark field guides for producing a shadow-free dark field illumination in incident light, multi-armed point light guides for producing inclined incident light with a predetermined adjustable incidence direction and linear guides for lateral bordering incident light dark field illumination with inclined shadows.

The LED illumination systems are preferred for use in the industrial image processing area with automated image analysis system. In these systems a number of LEDs is usually built into an LED illumination head, which are designed according to the above-described illumination types. Also ring guides, spot guides, linear guides, etc., are provided. In contrast to fiber optic illumination systems, in which light must be guided to the illumination head, each LED in the LED illumination head becomes an individual light source, when it is supplied with electric current.

The long service life of the LEDs in comparison to the halogen reflector lamps generally used for the cold light source is an often stated advantage of the LED illumination systems in contrast to the fiber optic illumination systems. However reduced brightness and less compact structure for the LED illumination heads are substantial disadvantages for the LED illumination systems in contrast to the fiber optic illumination systems.

The simpler electronic control of the LEDs is a decisive advantage of the LED illumination systems over the fiber optic illumination systems. Use of LED illumination for microscopic applications is increasing because of this advantage. U.S. Pat. No. 5,690,417 described an LED ring guide, with which individual LED groups can be controlled, e.g. arranged as circular or ring light segments. The incidence direction of the light in inclined incident light may be changed by control of these segments. Suitable control of the ring light segments in a predetermined sequence can produce the impression of a light rotating around the object. This type of moving illumination can help to obtain a better impression of the three dimensional shape of the object. Fiber optic illumination systems can control individual segments of lighting units only with considerable mechanical effort and expense. Segment control has not been commonly used for fiber optic systems for this reason.

The desired control of individual LEDs in LED illumination systems is often accomplished by means of digital control signals. In EP 1 150 154 A1 the use of a microcontroller for handling the control statements is suggested.

It has been shown that the known illumination systems for many application purposes are insufficient. Especially it is often desirable to be able to observe objects with the help of mixed light, i.e. incident light from different lighting units or illumination devices at the same time, for example using both incident and transmitted light at the same time.

The term "lighting unit" or "illumination device" means each standalone controllable combination of light sources mounted in a common housing for illumination of an object. An illumination system is at least one lighting unit or illumination device in combination with a control unit for control of the lighting unit or illumination device and/or the current associated with it. An example of an illumination device or lighting unit is an LED ring light and an example of an illumination system is the integrated LED ring light of EP 1 150 154 A1.

If mixed light observations are made with the available prior art systems, several LED illumination systems must be combined, for example a LED ring light for incident light production and an LED transmitted light source. The user must adjust each of these illumination devices or lighting units, i.e. its intensity, selected segments, etc., according to the structural conditions of the object to be observed. When the same object must be observed still later, often time consuming new adjustments of the illumination conditions must be performed. Their reproducibility is problematical, time consuming and often depends on the cleverness of the user. Furthermore currently each lighting or illumination device in these combinations of illumination systems has its own current and /or control unit, so that the total system takes up a comparatively large amount of space and is expensive.

SUMMARY OF THE INVENTION

It is an object of the present invention to provide an economical control unit, which permits mixed light observation of the above-described type with a microscope in a simple and rapid manner for the user or operator.

According to the basic concept of the invention the lighting units required for producing mixed light, especially for observation of an object with a microscope, are controlled with a single control unit. If LED systems are used as the lighting units, the control unit of the invention is in a position to control at least parts of the LED systems simultaneously or at the same time, in so far as their structure allows. Understandably it is also possible to use other components producing electromagnetic radiation instead of the LEDs, e.g. incandescent lamps, laser diodes, VCSEL, etc., or combinations of these components. Each of the lighting units connected to the control unit can be adjusted according to commands and/or information from the user or operator, which are established for each individual lighting unit. In this way any mixed light state can be produced.

Thus a control unit is available by which the respective brightness of the controlled lighting units and/or their regulated portions can be controlled to produce mixed light illumination, especially for microscopy.

In a preferred embodiment of the invention the control unit is connect to a computer by means of an interface in it. This computer can be a conventional personal computer. It is possible to pre-select the mixed light state in the computer with suitable computer software. The computer transmits control signals to the control unit, which translates the control signals and controls the illumination devices or units accordingly. Similarly it is possible to convey the control signals to the computer, for example, by operating parameters of the lighting units or illumination devices. This is especially advantageous for industrial image processing applications.

The control unit further can have available at least one memory device, in which user commands and/or operation information are stored. That can include, for example, certain controls for connected lighting units, including their controlled segments with associated brightness parameters and, if necessary, information regarding the time sequence of the segment control, regarding pulse operation or rotation operation. It is similarly possible that the memory device is located in the computer connected to the control unit. In this way it is possible to reproducibly reproduce a mixed light condition or state by retrieval of or calling up of the user information or commands. It is similarly conceivable that the memory device already contains predetermined user information or commands for the various lighting units, so-called "pre-sets".

Furthermore arbitrary groups of user commands or data, a so-called user profile, can be stored in the memory device and maintained by the computer and/or the control unit so that the user profile can be called up from the computer and/or control unit, changed and/or stored again. It is similarly possible to transmit or convey the user commands or data and/or pre-sets and/or the user profile from the memory device of the control unit to the memory unit of the computer, or vice versa. In this way it is possible to permanently archive, maintain and edit a number of user profiles.

In an especially preferred embodiment of the invention the control unit has function keys or buttons available to it, by which a number of user commands or data or pre-sets for producing mixed light states can be called up from the memory device in a simple manner. Also the user can store commands or data with these function keys. Also a foot switch for calling up user commands or data can be used instead of or in addition to the function keys. It is also possible that control signals of the computer connected to the control unit can be used to call up and store user commands or information.

The control unit according to the invention permits at least one part of at least one lighting unit connected to the control unit to be controlled in at least one interval. When the control comprises a repeated synchronized turning on and off of several lighting units, for example a stroboscopic effect can be produced while maintaining the mixed light characteristics. Understandably also one or more partial region or part of only one lighting unit can be controlled in intervals during which the controlled part or parts of other lighting units are temporarily maintained constant. When control of at least a part of several lighting units occurs simultaneously in a single non-repeating interval a mixed light flash may be produced. Also a single non-repeating amplification of the adjusted steady light can occur during this interval. The mixed light flash is then produced in addition to the adjusted or set steady mixed light.

It is similarly provided that image-taking devices can be connected to the control unit and that the interval control of the lighting units occurs based on control signals from the image-taking devices. For example when a photo camera is connected to the control unit as image-taking device, the shutter device of the photo camera can transmit a control signal to the control unit, on the basis of which the control unit activates the lighting units to produce the mixed light flash.

Furthermore in an especially advantageous manner interval control allows moving light sources and/or lighting units with mixed light characteristics to be simulated in a special manner by sequential control of partial regions or parts of one and/or several lighting units. Thus various changing light and shadow images are produced. If an LED ring light is used as lighting unit, an impression of a rotating light source arises by sequential control of adjacent ring segments. When more than one lighting unit is used, synchronously or oppositely rotating light sources and/or other arbitrarily moving patterns or combinations can be produced.

Thus the set mixed light characteristics are maintained e.g. in the synchronous, i.e. running in the same direction, rotation of parts or partial regions of several lighting units during rotation. Understandably not only LED ring lights, but any suitable lighting unit can be included in the invention. Furthermore each of the given control patterns described above can be produced with varying brightness.

In an especially preferred embodiment of the invention means for measuring the temperature of the respective lighting units, which are coupled with the control unit, are provided, so that the control unit sends out a warning signal to the user when a threshold temperature is exceeded and/or automatically shuts off or dims (i.e. reduces its brightness) the lighting unit when its maximum temperature is exceeded. In this way an overload and/or premature aging of the light source in the lighting device is prevented and the operating costs are thus minimized.

In a similarly especially preferred embodiment of the invention a control unit is provided, which has available means for measuring operating current strength of the illumination device or lighting unit. The threshold and/or maximum temperature of the lighting unit depends on the operating current strength used by the respective light sources. Thus the control unit correlates the operating current strength with the temperature of the lighting unit and computes the current threshold and/or maximum temperature by a suitable algorithm.

BRIEF DESCRIPTION OF THE DRAWING

The objects, features and advantages of the invention will now be described in more detail with the aid of the following description of the preferred embodiments, with reference to the following figures, in which.

DETAILED DESCRIPTION OF THE INVENTION

Figure 1:
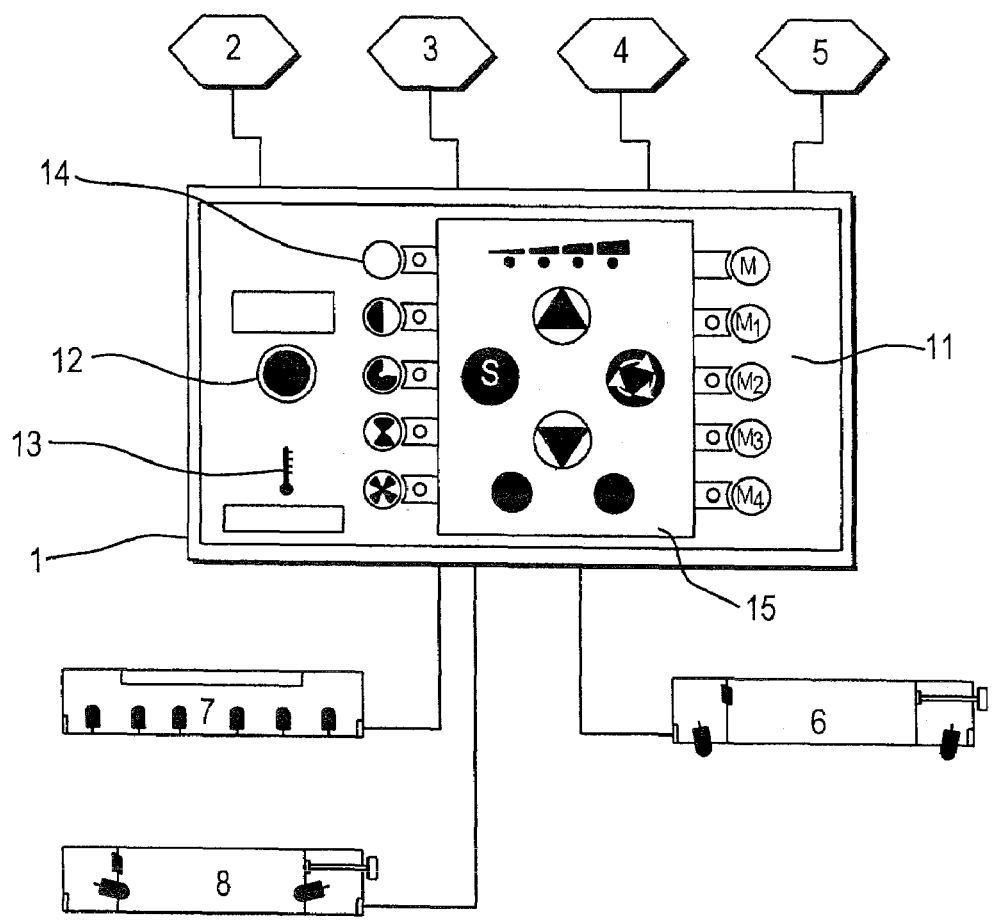
FIG. 1 is a diagrammatic plan view of the control unit according to the invention with connected lighting units, operating elements and a computer interface.
Figure 2:
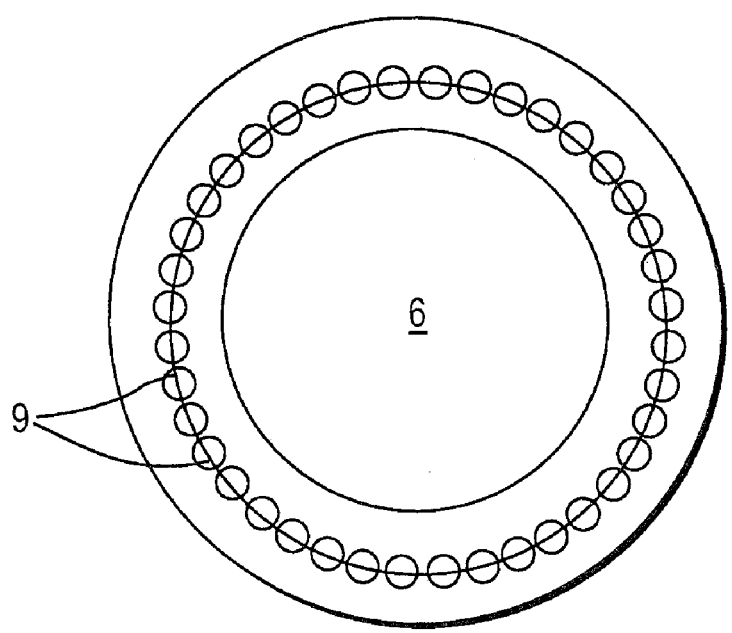
FIG. 2 is a plan view of an LED incident light brightness field ring light acting as a lighting unit in the apparatus shown in FIG. 1.

The control unit 1 shown in FIG. 1 has an interface 2 for connection to an external network, flash synchronization means 3 for connection to an external image-taking unit, a foot switch 4 for retrieval and switching between different user settings or commands and an interface 5 for connection with an external computer. An LED incident light brightness field ring light 6, an LED incident light dark field ring light 8 and an LED transmitted light 7 are connected to the control unit 1 and act as the lighting units of the invention, which are controlled by the control unit 1. The plan view of ring light 6 shown in FIG. 2 shows the circular arrangement of the individual LEDs 9.

Different mixed light states can be produced by suitable control of the lighting units 6, 7 and 8 by the control unit 1. In order to maintain a definite mixed light state the user must retrieve or call up generally its user commands or data for each of the connected lighting units and/or the predetermined pre-sets. To produce the user commands or data first the lighting unit 6 to 8 to be adjusted is selected with the help of the unit selection switch 12. The desired segments of each lighting unit 6 to 8 are controlled by operation of the segment selection switch 14. In the present example full circle, half circle and quarter circle are selectable, also as respective neighboring or opposing segments. The brightness adjustment occurs by a key of the option selection field 15. Similarly adjustments for simulating motion of light sources of the lighting unit, stroboscopic effect and flash functions can be performed with the option selection field 15.

These user commands or data are stored with the help of the function keys 11 after setting them. Similarly the function keys 11 can be used to call up or retrieve user commands or data and/or pre-sets already present. The control unit 1 has a temperature-warning indicator 13, which informs the user regarding the temperature present in the lighting units 6, 7 and 8. In the present example the temperature-warning indicator 13 is formed with a thermometer scale. The temperature-warning indicator 13 warns the user visually prior to reaching an operating temperature of a lighting unit 6 to 8 that is too high when a predetermined threshold temperature is reached. The threshold temperature depends on the set LED operating current strength and is between 35° C. and 70° C. in the present example.

The data sheets provided by the LED manufacturer describe the combinations of the operating current strength values and threshold and/or maximum temperature values for the LEDs that are used. The control unit 1 has an integrated microprocessor, which determines the respective threshold and/or maximum temperature based on a comparison table with the aid of a suitable algorithm. When the threshold and/or maximum temperature is reached, the user can dim or better cool the concerned lighting unit. If a maximum temperature is exceeded, which in the embodiment shown is 5° C. above the threshold temperature, the control unit 1 is automatically switched off and is put into operation again when sufficient cooling has taken place. Alternatively the control unit 1 can also automatically dim the concerned lighting unit. The maximum temperature is set so that the maximum allowed LED temperatures specified in the LED data sheets from the manufacturer are not reached.

The present invention has the advantage in relation to the state of the art that only one control unit is required for producing mixed light states, which is connected to all lighting units. The lighting units are controlled according to the requirements and according to the user commands and information, so that the entire light system, comprising the control unit and the lighting units, is compact in its measurements. Furthermore the entire system is economical since a plurality of control units and network devices are eliminated. Since the control unit has at least one memory device available or can be connected to a computer, which usually has a memory, mixed light states set by user commands can comfortably be stored and again retrieved. In this way the time consuming readjustment of the mixed light state is not required, when the same object is observed again. A plurality of user settings assembled in a user profile can be archived and maintained in the control unit and/or a connected computer. Furthermore the invention permits complicated mixed light states to be set up and the object can be observed with respective optimum mixed light states. Especially mixed light stroboscopic observations, mixed light flash observations and mixed light moving light observations are possible. All adjustments or settings and operations could occur by means of a connected computer and its software so that the invention may also be used in industrial image processing.

The disclosure in German Patent Application 203 04 412.6 of Mar. 26, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a control unit for mixed light illumination, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A control unit for controlling mixed light illumination for a microscope, a stereomicroscope, a macroscope or an industrial image processing machine, to which at least three lighting units are connected to provide the mixed light illumination, wherein said control unit comprises means for simultaneously controlling respective parts of each of said at least three lighting units according to user commands during at least one time interval.

2. The control unit as defined in claim 1, further comprising means for adjusting brightness of said respective parts of each of said at least three lighting units, whereby the brightness of said respective parts of each of said at least three lighting units is regulated.

3. The control unit as defined in claim 1, further comprising an interface for at least one computer so that data exchange can occur between the at least one computer and the control unit.

4. The control unit as defined in claim 3, further comprising at least one memory device, and wherein said user commands are storable and retrievable in and from said at least one memory device.

5. The control unit as defined in claim 4, further comprising means for storing and retrieving said user commands in groups from said at least one memory device and wherein said user commands in each of said groups are simultaneously stored and retrieved from said at least one memory device.

6. The control unit as defined in claim 4, wherein said at least one computer comprises a memory unit, and further comprising means for sending said user commands in said memory device to said memory unit of said at least one computer and means for receiving said user commands in said memory unit of said at least one computer.

7. The control unit as defined in claim 1, further comprising means for storing and retrieving said user commands.

8. The control unit as defined in claim 7, wherein said means for storing and retrieving said user commands comprises at least one of function keys and a foot switch.

9. The control unit as defined in claim 7, further comprising an interface for connecting the control unit to a computer so that data exchange occurs between the computer and the control unit by means of control statements provided in said computer, said data exchange including said user commands.

10. The control unit as defined in claim 1, further comprising an interface for at least one external image-taking device and means for interval control of at least one of the lighting units based on control signals from said at least one external image-taking device.

11. The control unit as defined in claim 10, wherein said interval control simulates a moving light source.

12. The control unit as defined in claim 10, wherein said interval control synchronizes a plurality of said lighting units.

13. A control unit for controlling mixed light illumination for a microscope, a stereomicroscope, a macroscope or an industrial image processing machine, to which plural lighting units are connected to provide the mixed light illumination;

wherein said control unit comprises means for simultaneously controlling respective parts of at least two of said lighting units according to user commands during at least one time interval, means for detecting a temperature of said lighting units, said means for detection of said temperature of said lighting units being at least partially located in said lighting units, and means for generating a warning signal for an operator when said temperature detected by said means for detecting exceeds a threshold temperature.

14. The control unit as defined in claim 13, further comprising means for detecting an operating current strength for current flowing through said lighting units and wherein the threshold temperature depends on said operating current strength.

15. A control unit for controlling mixed light illumination for a microscope, a stereomicroscope, a macroscope or an industrial image processing machine, to which plural lighting units are connected to provide the mixed light illumination;

wherein said control unit comprises
means for simultaneously controlling respective parts of at least two of said lighting units according to user commands during at least one time interval,
means for detecting a temperature of said lighting units, said means for detecting said temperature of said lighting units being at least partially located in said lighting units, and
means for shutting off said lighting units when said temperature detected by said means for detecting exceeds a maximum allowed temperature of said lighting units.

16. The control unit as defined in claim 15, further comprising means for detecting an operating current strength for current flowing through said lighting units and wherein the maximum allowed temperature depends on said operating current strength.

17. A control unit for controlling mixed light illumination for a microscope or a stereomicroscope, to which at least three lighting units are connected to provide the mixed light illumination, wherein said control unit comprises
means for simultaneously controlling respective parts of each of said at least three lighting units according to user commands during at least one time interval in order to regulate or adjust said respective parts of each of said at least three lighting units, whereby brightness of said respective parts of said lighting units is regulated;
at least one memory device for storing said user commands, from which said user commands are storable and retrievable;
means for input of said user commands including an interface for a computer so that data exchange can occur between the computer and the control unit and at least one of function keys and a foot switch, said data exchange including transmission and reception of said user commands;
an interface for at least one external image-taking device for generating control signals for the mixed light illumination; and
means for interval control of at least one of the lighting units based on said control signals from said at least one external image-taking device.

18. The control unit as defined in claim 17 further comprising means for storing and retrieving said user commands in groups in and from said at least one memory device and wherein said user commands in each of said groups are simultaneously stored and retrieved from said at least one memory device.

19. The control unit as defined in claim 17, wherein said interval control simulates a moving light source.

20. The control unit as defined in claim 17, wherein said interval control synchronizes a plurality of said lighting units.

21. A control unit for controlling mixed light illumination for a microscore, a stereomicroscope, a macroscope or an industrial image processing machine, to which a plurality of lighting units is connected to provide the mixed light illumination, wherein said control unit comprises
means for simultaneously controlling respective parts of at least two of said lighting units according to user commands during at least one time interval in order to regulate or adjust said respective parts of said lighting units, whereby brightness of said respective parts of said lighting units is regulated;

at least one memory device for storing said user commands, from which said user commands are storable and retrievable;

means for input of said user commands including an interface for a computer so that data exchange can occur between the computer and the control unit and at least one of function keys and a foot switch, said data exchange including transmission and reception of said user commands;

an interface for at least one external image-taking device for generating control signals for the mixed light illumination;

means for interval control of at least one of the lighting units based on said control signals from said at least one external image-taking device;

means for detecting a temperature of said lighting units, said means for detecting said temperature of said lighting units being at least partially located in said lighting units; and means for generating a warning signal for an operator when said temperature detected by said means for detecting exceeds a threshold temperature.

22. The control unit as defined in claim 21, further comprising means for detecting an operating current strength for current flowing through said lighting units and wherein the threshold temperature depends on said operating current strength.

23. A control unit for controlling mixed light illumination for a microscope, a stereomicroscope, a macroscope or an industrial image processing machine, to which a plurality of lighting units is connected to provide the mixed light illumination, wherein said control unit comprises means for simultaneously controlling respective parts of at least two of said lighting units according to user commands during at least one time interval in order to regulate or adjust said respective parts of said lighting units, whereby brightness of said respective parts of said lighting units is regulated;

at least one memory device for storing said user commands, from which said user commands are storable and retrievable;

means for input of said user commands including an interface for a computer so that data exchange can occur between the computer and the control unit and at least one of function keys and a foot switch, said data exchange including transmission and reception of said user commands;

an interface for at least one external image-taking device for generating control signals for the mixed light illumination;

means for interval control of at least one of the lighting units based on said control signals from said at least one external image-taking device;

means for detecting a temperature of said lighting units, said means for detection said temperature of said lighting units being at least partially located in said lighting units; and means for shutting off said lighting units when said temperature detected by said means for detecting exceeds a maximum allowed temperature of said lighting units.

24. The control unit as defined in claim 23, further comprising means for detecting an operating current strength for current flowing through said lighting units and wherein the maximum allowed temperature depends on said operating current strength.

25. The control unit as defined in claim 1, wherein said at least three lighting units include a first LED lighting unit for generating incident light-bright field illumination, a second LED lighting unit for generating incident light-dark field illumination, and a third LED lighting unit for generating transmitted light.

26. The control unit as defined in claim 25, further comprising at least one memory device for storing said user commands, from which said user commands are storable and retrievable; means for input of said user commands including an interface for a computer so that data exchange can occur between the computer and the control unit and at least one of function keys and a foot switch, said data exchange including transmission and reception of said user commands; an interface for at least one external image-taking device for generating control signals for the mixed light illumination; and means for interval control of at least one of the lighting units based on said control signals from said at least one external image-taking device.

27. A control unit for controlling mixed light illumination for a microscope, a stereomicroscope, a macroscope or an industrial image processing machine, to which plural lighting units are connected to provide the mixed light illumination, wherein said control unit comprises means for simultaneously controlling respective parts of at least two of said plural lighting units according to user commands during at least one time interval and said respective parts comprise a corresponding plurality of individual light sources within each of said at least two lighting units, so that said light sources of each of said at least two of said plural lighting units are individually controlled by said means for simultaneously controlling.

28. A control unit for controlling mixed light illumination for an industrial image processing machine, to which at least three lighting units are connected to provide the mixed light illumination, wherein said control unit comprises means for simultaneously controlling respective parts of each of said at least three lighting units according to user commands during at least one time interval.

29. A control unit for controlling mixed light illumination for a stereomicroscope, to which at least three lighting units are connected to provide the mixed light illumination, wherein said control unit comprises means for simultaneously controlling respective parts of each of said at least three lighting units according to user commands during at least one time interval.

* * * * *